(12) United States Patent
Uemura

(10) Patent No.: US 7,515,067 B2
(45) Date of Patent: Apr. 7, 2009

(54) PARKING ASSIST APPARATUS

(75) Inventor: Takahiro Uemura, Bunkyo-ku (JP)

(73) Assignee: Clarion Co., Ltd., Tokyo (JP)

( * ) Notice: Subject to any disclaimer, the term of this patent is extended or adjusted under 35 U.S.C. 154(b) by 305 days.

(21) Appl. No.: 11/389,244

(22) Filed: Mar. 27, 2006

(65) Prior Publication Data

US 2008/0079607 A1  Apr. 3, 2008

(30) Foreign Application Priority Data

Mar. 28, 2005  (JP) ............... 2005-090588

(51) Int. Cl.
 *B60Q 1/48* (2006.01)
(52) U.S. Cl. .................. 340/932.2; 340/436; 340/435
(58) Field of Classification Search ............. 340/435, 340/436, 438, 937; 348/148
 See application file for complete search history.

(56) References Cited

U.S. PATENT DOCUMENTS

| | | | |
|---|---|---|---|
| 6,476,730 B2 | 11/2002 | Kakinami et al. | |
| 6,654,670 B2 * | 11/2003 | Kakinami et al. | 701/1 |
| 7,295,227 B1 * | 11/2007 | Asahi et al. | 348/118 |

FOREIGN PATENT DOCUMENTS

| | | |
|---|---|---|
| EP | 1 148 461 A2 | 10/2001 |
| JP | A 2003-112590 | 4/2003 |
| JP | 2004-203365 A | 7/2004 |

* cited by examiner

*Primary Examiner*—Jeff Hofsass
*Assistant Examiner*—Ojiako Nwugo
(74) *Attorney, Agent, or Firm*—Oliff & Berridge, PLC

(57) ABSTRACT

A parking assist apparatus characterized by including: a camera (1) for taking an image of a backside of a vehicle; a display unit (6); a movement distance detecting unit (2) for detecting a distance of vehicle movement; a steering angle detecting unit (3) for detecting a steering rudder angle; and an anticipated-course calculation unit (5) for calculating an anticipated course of the vehicle in backing movement according to the steering rudder angle, wherein the parking assist apparatus further includes a display control unit (4) configured to superimpose on the image taken by the camera a discontinuous line including successive marks (PA1, PA2 . . . / PB1, PB2 . . . ) as the anticipated course and display the superimposed image on the display unit (6), and when the vehicle moves the display control unit (4) is configured to shift the marks according to the distance of the vehicle movement.

5 Claims, 8 Drawing Sheets

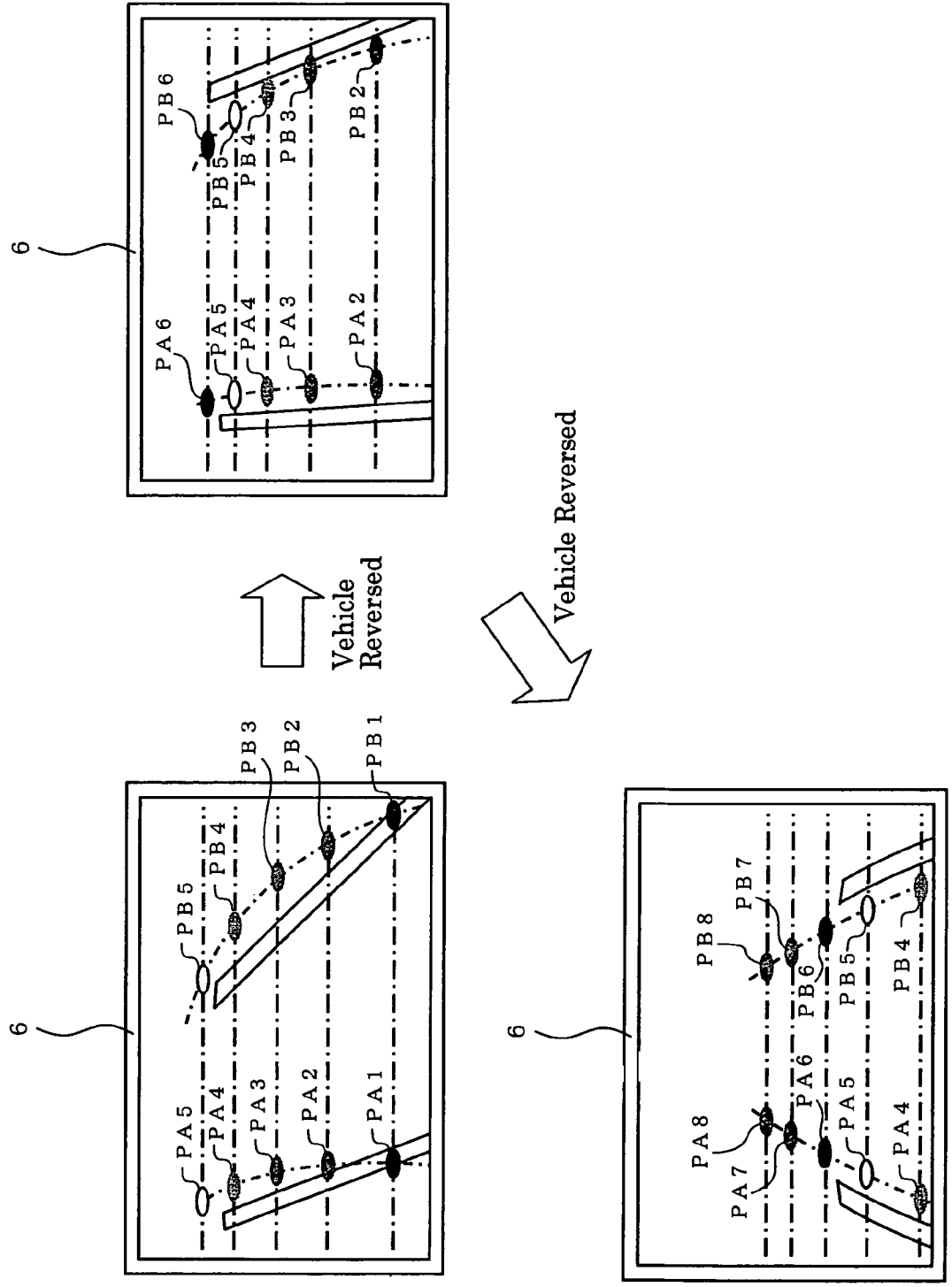

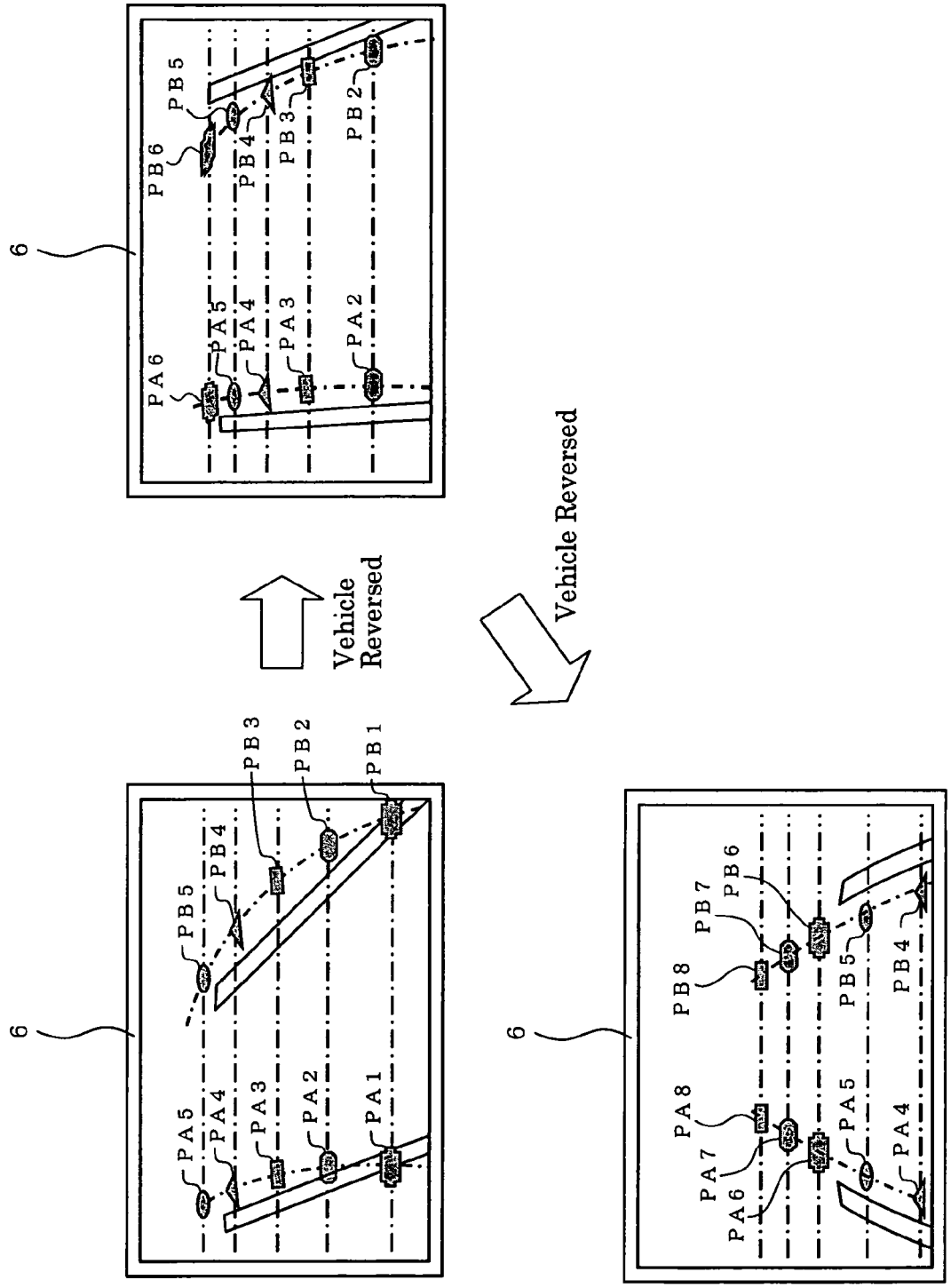

PARKING ASSIST APPARATUS

BACKGROUND

1. Field of the Invention

This invention relates to a parking assist system for backing a vehicle up into a place to be parked.

2. Description of Related Art

In general a backing operation of a car is more difficult than a regular operation of a car because it is difficult for a driver to estimate the distance between the car and other obstacles, and the backing operation itself is difficult, and there is trouble seeing backward. To solve this problem there is on the market a parking assist apparatus including a camera disposed on the rear portion of a car for photographing backward and a display disposed in the inside of the car, wherein the display is configured to show images photographed by the camera during a backing operation so that assist the driver of the car visually. Recently for more convenience there is proposed another parking assist apparatus configured to calculate "anticipated course" of the wheels based on a rudder angle of a steering wheel and display a target line corresponding to a necessary moving distance superimposed on an image photographed by a camera. In such parking assist apparatus, the anticipated course laterally shifts linking to the steering operation, and thereby the movement of the car in terms of the lateral direction can be easily recognized by the driver (e.g. JP2003-112590A).

However, according to such conventional parking assist apparatus, longitudinal movement of the car cannot be easily recognized by a driver, especially when only an image of an asphalt road surface is displayed.

SUMMARY

The present invention has been made in consideration of above mentioned actualities, thus one object of the invention is to provide a parking assist apparatus capable of allowing a driver to easily and/or precisely recognize longitudinal movement of a vehicle.

One aspect of the present invention is that a parking assist apparatus includes: a camera configured to take an image of a backside of a vehicle; a display unit configured to display the image taken by the camera; a movement distance detecting unit configured to detect a distance of movement of the vehicle; a steering angle detecting unit configured to detect a steering rudder angle of a steering wheel of the vehicle; and an anticipated-course calculation unit configured to calculate an anticipated course of the vehicle in backing movement according to the steering rudder angle detected by the steering angle detecting unit, wherein the parking assist apparatus further comprises a display control unit configured to superimpose on the image taken by the camera a discontinuous line including successive marks as the anticipated course calculated by the anticipated-course calculation unit and display the superimposed image on a screen of the display unit, and when the vehicle moves the display control unit is configured to shift the marks on the screen of the display unit according to the distance of the movement of the vehicle detected by the movement distance detecting unit.

According to this aspect, parking assist can be carried out with the parking assist apparatus by displaying the anticipated-course on the image of the backside taken by the camera during a parking operation. Any kind of camera, e.g. a camcorder, can be employed as the camera.

A driver can easily recognize the anticipated-course represented by the discontinuous line including successive marks. Especially, longitudinal movement of the vehicle can be easily recognized for a driver by seeing the marks on the screen configured to shift in accordance with the vehicle movement.

Another aspect of the present invention is that in the parking assist apparatus each mark consists of a point.

Another aspect of the present invention is that in the parking assist apparatus each mark consists of a line segment.

Another aspect of the present invention is that in the parking assist apparatus the marks consist of points and line segments.

Another aspect of the present invention is that in the parking assist apparatus a color of each mark is different from that of a mark adjacent to the each mark.

According to this aspect, shifting of the anticipated course points can be recognized more clearly, allowing a driver to recognize longitudinal movement of the vehicle more easily on the screen.

Another aspect of the present invention is that in the parking assist apparatus an outer shape of each mark is different from that of a mark adjacent to the each mark.

According to this aspect, shifting of the anticipated course marks can be recognized more clearly, allowing a driver to recognize longitudinal movement of the vehicle more easily on the screen.

Various combinations of colors/hues and outer shapes may be chosen for the marks for indicating the anticipated course so that a user can be assisted in parking more efficiently by the parking assist apparatus.

Another aspect of the present invention is that in the parking assist apparatus the marks corresponding to within a predetermined distance from a rear of the vehicle are displayed on the screen of the display unit.

According to this aspect, in the case, for example, the vehicle is reversed into a parking lot having an obstacle such as an end wall, a driver can recognize the distance between the vehicle and the obstacle more precisely on the screen.

These and other objects, features and advantages of the invention will be appreciated upon reading of the description of the invention when in conjunction with the attached drawings, with the understanding that some modifications, variations and changes of the invention could be easily made by the skilled person in the art to which the invention pertains without departing from the spirit of the invention or the scope of the claims The present application is based on, and claims priority from, Japanese Patent Application No. 2005-90588, filed on Mar. 28, 2005, the contents of which are hereby incorporated by reference herein in its entirety.

BRIEF DESCRIPTION OF THE DRAWINGS

For a better understanding of the invention, reference is made to the attached drawings, wherein:

FIG. 7 is a view showing transitions of a display image of a fourth embodiment of the present invention; and FIG. 8 is a view showing transitions of a display image of a fifth embodiment of the present invention.

DETAILED DESCRIPTION OF THE PREFERRED EMBODIMENTS

Figure 1:
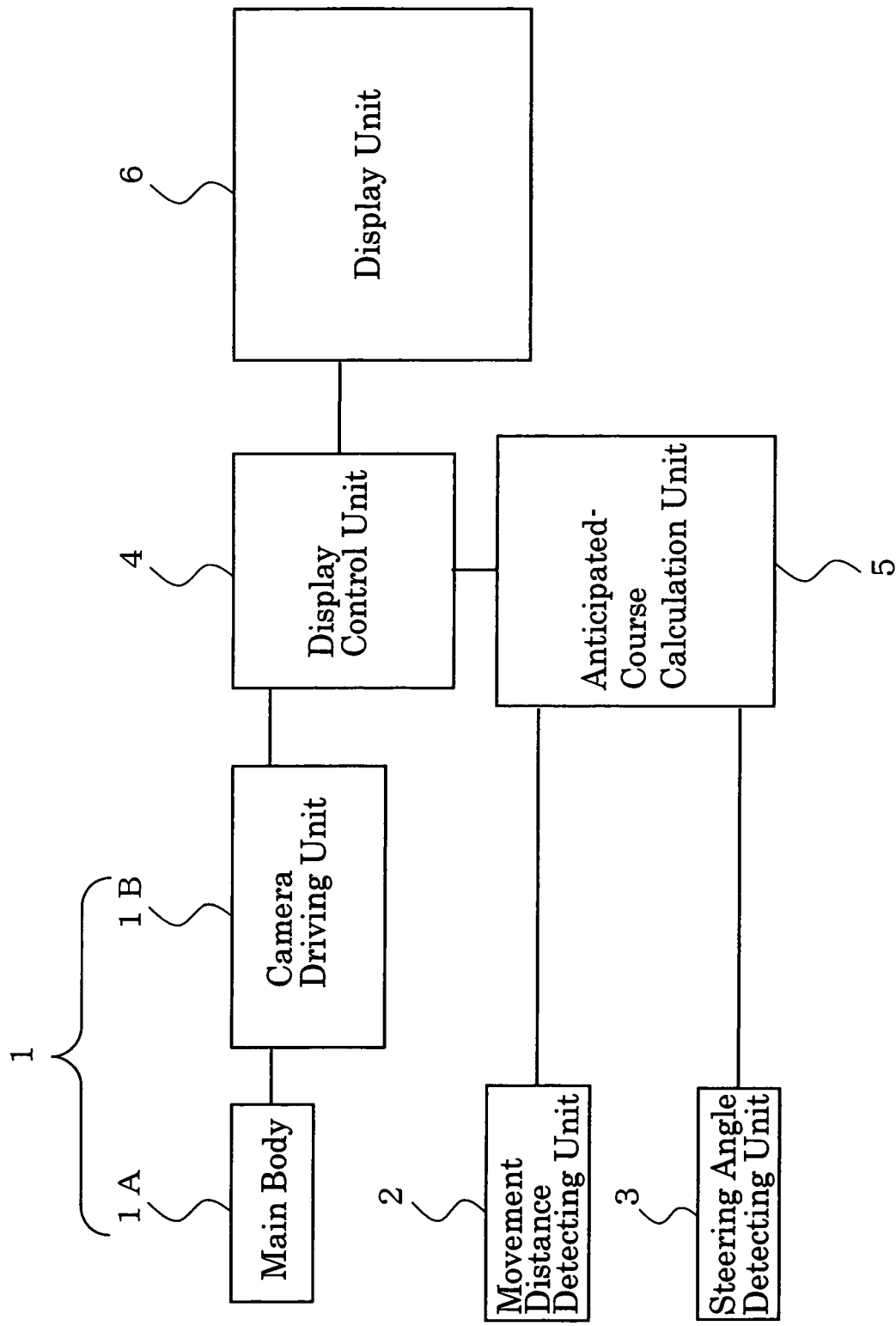
FIG. 1 is a block diagram schematically showing a structure of a first embodiment of the present invention.

Hereinafter embodiments of the present invention will be described referring to the drawings attached hereto.

First Embodiment

FIG. 1 is a block diagram schematically showing a structure of a first embodiment of the present invention.

A camera 1 is provided with a main body 1A and a camera driving unit 1B. The operations of the main body 1A are controlled by the camera driving unit 1B. Taken images are outputted via the camera driving unit 1B to a display control unit 4 electrically connected to the camera driving unit 1B.

A movement distance detecting unit 2 is configured to calculate a movement distance based on an angle of rotation of a wheel of a vehicle. The detected values are outputted to an anticipated-course calculation unit 5 electrically connected to the movement distance detecting unit 2.

A steering angle detecting unit 3 is configured to detect a steering rudder angle of a steering of the vehicle and the detected angle is outputted to the anticipated-course calculation unit 5 electrically connected to the steering angle detecting unit 3.

The anticipated-course calculation unit 5 is configured to calculate an anticipated course corresponding to reverse movement of the vehicle based on the steering rudder angle detected by the steering angle detecting unit 3 and output a signal corresponding to the anticipated course to the display control unit 4 electrically connected thereto.

The anticipated-course calculation unit 5 is configured to calculate coordinates of each point which represents the anticipated course on the display based on the movement distance detected by the movement distance detecting unit 2 and output them to the display control unit 4 electrically connected thereto.

The display control unit 4 is configured to dispose a point image on the calculated coordinates of each point, superimposing the point images on the image taken by the camera 1 and output and display them on a display unit 6 electrically connected to the display control unit 4.

Figure 2:
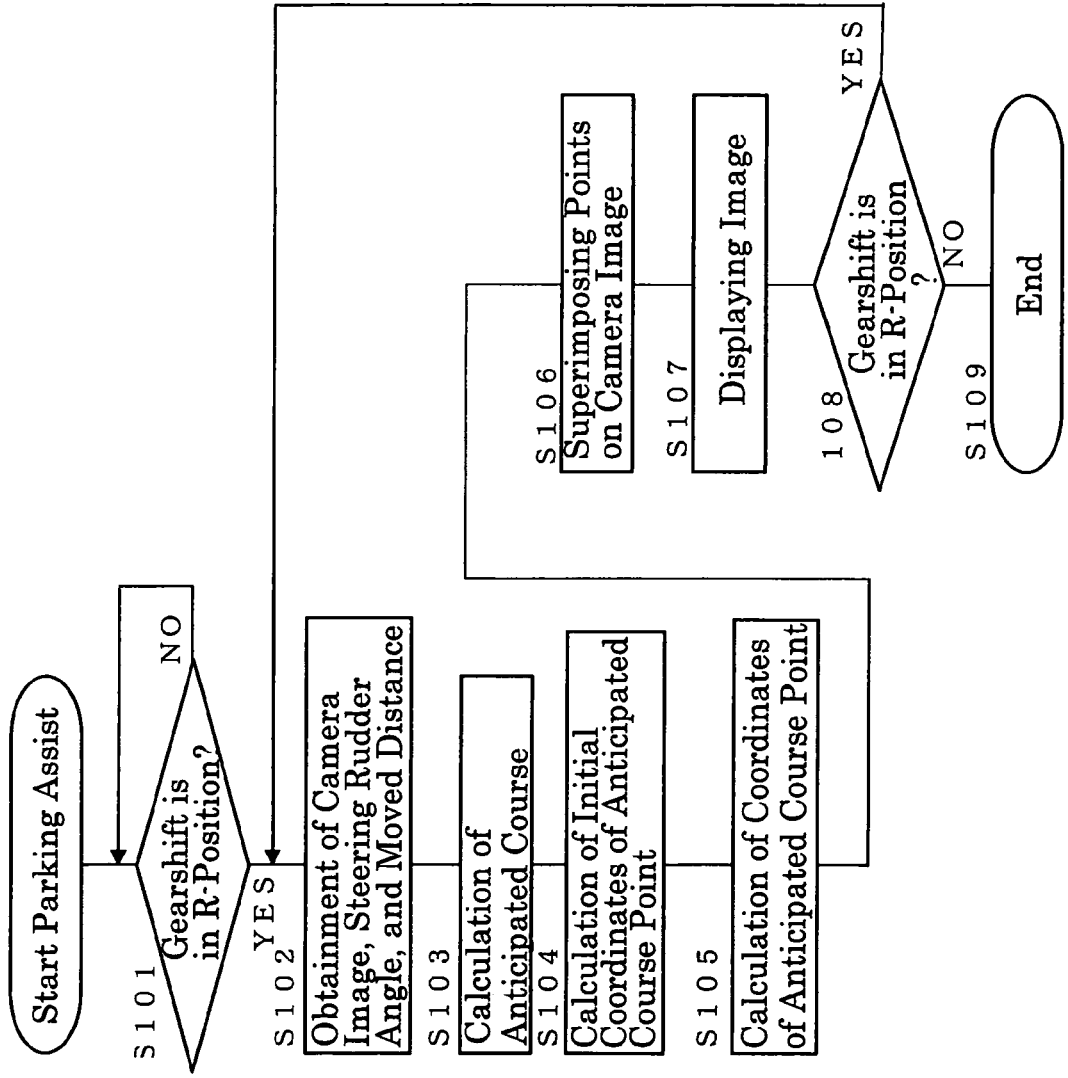
FIG. 2 is a flowchart showing operations of the first embodiment of the present invention.

Next, the operation of the parking assist apparatus according to the present invention will be described referring to the flowchart shown in FIG. 2.

At Step S101 whether a gearshift is on a "R-position" which indicates backing movement or not is judged. If the gearshift is on the R-position, the flow shifts to Step S102 to initiate a parking assist operation. If the gearshift is not on the R-position, the flow returns to Step S101.

At Step S102 the display control unit 4 obtains a camera image photographed by the camera 1. Also, the anticipated-course calculation unit 5 obtains data of a movement distance detected by the movement distance detecting unit 2 and a steering rudder angle detected by the steering angle detecting unit 3. Then, the flow shifts to Step S103.

At Step S103 the anticipated-course calculation unit 5 calculates an anticipated course of backing movement based on the steering rudder angle which can be obtained from the data obtained at Step S102.

There are proposed various methods for calculating an anticipated course such as a method for calculating an antici- pated course by repeatedly estimating an amount of a following steering rudder angle based on time change of the steering rudder angle. The method for calculating an anticipated course can be discretionarily selected. In this embodiment, it is employed a general method which calculates an anticipated course based on an angle of a front wheel corresponding to a steering rudder angle at the time on the presumption that the steering rudder angle remains unchanged. Then the flow shifts to Step S104.

At step S104 coordinates of a plurality of marks to be plotted on a screen of the display unit 6 are calculated. The anticipated course is represented by line formed with successive marks. In other words the anticipated course is indicated by discontinuous line which is formed with a series of marks. A driver can perceive the line as a representation of the anticipated course, whereas the line is discontinuous. In this embodiment, a point is used as a mark. More particularly, a laterally long-oval shaped point is used as the mark.

Figure 3:
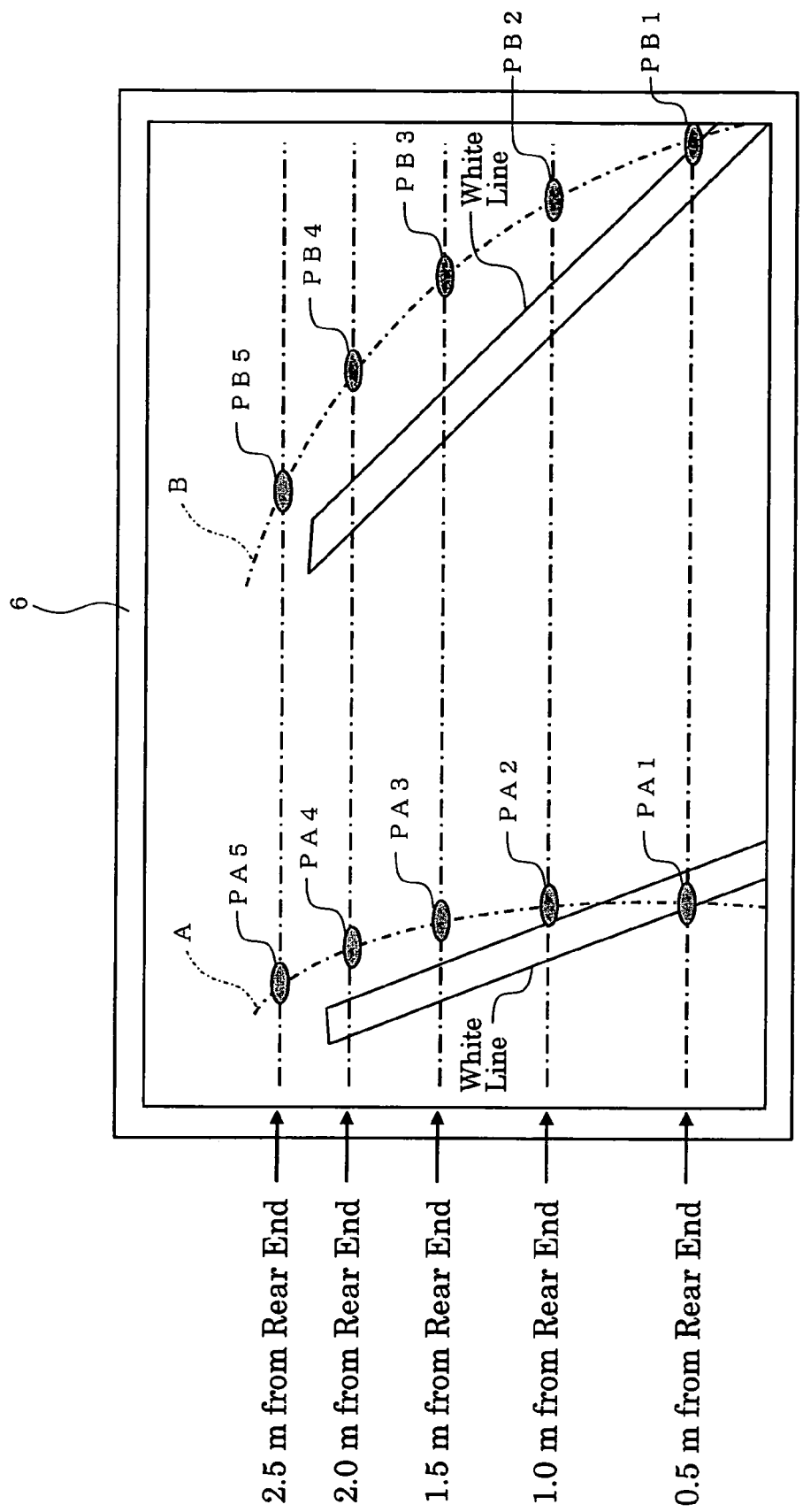
FIG. 3 is a view illustrating a display image of the first embodiment of the present invention.

For instance, as shown in FIG. 3, when anticipated course points PA1-PA5 and PB1-PB5 are respectively plotted on the anticipated courses A and B each corresponding to the left and right wheels calculated at Step S103, corresponding coordinates necessary to display anticipated course point PA1-PA5 and PB1-PB5 on the screen of the display unit 6 are calculated. The respective clearance between the anticipated course points PA1-PA5/PB1-PB5 may be discretionarily set. In this embodiment, as shown in FIG. 3, it is set that each clearance corresponds to 0.5 meters. In this embodiment anticipated course points within a predetermined distance from the rear end of the vehicle are configured to be displayed on the screen of the display unit 6. Specifically in this embodiment, anticipated course points within 3 meters from the rear end of the vehicle are configured to be displayed. The marks representing the anticipated course are not a continuous line, therefore, a mark corresponding to exact 3 meter distance from the rear end are not always displayed. However, a mark substantially corresponding to the predetermined distance from the rear end (i.e. an anticipated course point corresponding about 3 meters from the rear end in this embodiment) can be displayed. Then the flow shifts to Step S105.

Figure 4:
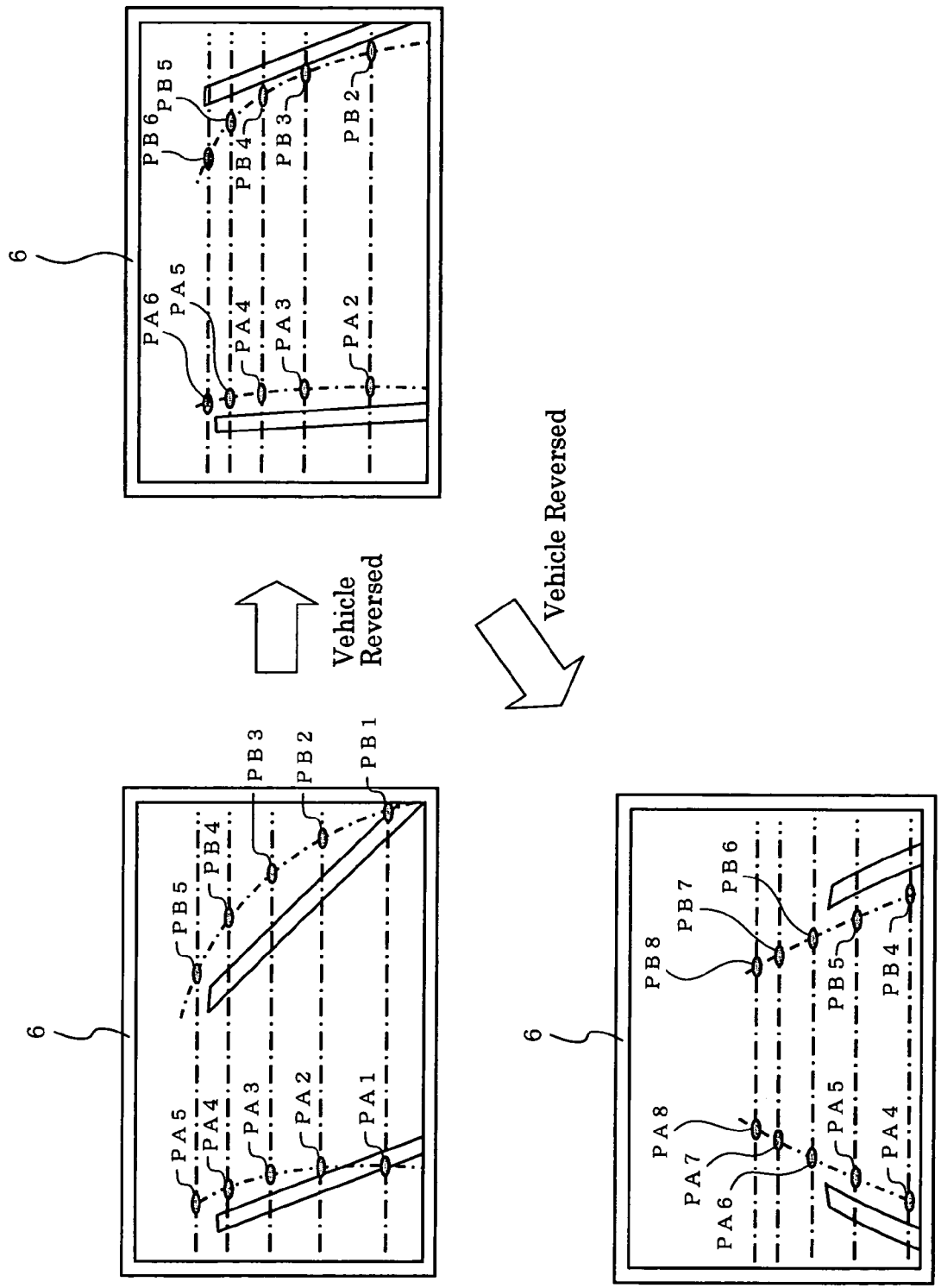
FIG. 4 is a view showing transitions of the display image of the first embodiment of the present invention.

At Step S105 following coordinates of each anticipated course point PA1-PA5 and PB1-PB5 are calculated by the anticipated-course calculation unit 5 according to the moved distance of the vehicle detected by the movement distance detecting unit 2. For example, when the vehicle is reversed for 0.3 meters, following coordinates are calculated according to a preset corresponding relationship between movement distances of the vehicle and amounts of changes of location coordinates on the screen of the display unit 6 so that the anticipated course points PA1-PA5 and PB1-PB5 look as if the points come close to the vehicle for 0.3 meters (i.e. the points shift downward on the screen of the display unit 6). Even when the vehicle is backed, since the anticipated course points within 3 meters from the rear end of the vehicle are configured to be displayed on the screen of the display unit 6 in this embodiment, new anticipated course points PA6, PA7 . . . and PB6, PB7 . . . are displayed (See, FIG. 4). Thereby the driver can recognize the movement of the vehicle and the anticipated course corresponding to a certain distance from the vehicle at all times. Then the flow shifts to Step S106.

At Step S106, point images are disposed on the coordinates of the anticipated course points PA1-PA5 and PB1-PB5 calculated in the display control unit 4 at Step S105 and then are superimposed on an image taken by the camera 1. Then the flow shifts to Step S107.

At Step S107 the image taken by the camera 1 which is superimposed at Step S106 and the anticipated course points PA1-PA5 and PB1-PB5 are outputted and displayed on the screen of the display unit 6. Then the flow shifts to Step S108.

At Step S108, whether a gearshift is on the R-position which indicates backing movement or not is judged. If the gearshift is on the R-position, the flow returns to Step S102 to continue the parking assist operation. If the gearshift is not on the R-position, the flow shifts to Step S109 to terminate the parking assist operation.

By the operation as described above, as shown FIG. 4, the anticipated course points PA1-PA5 and PB1-PB5 move on the screen of the display unit 6 in accordance with the backing movement of the vehicle. Thus, the anticipated course points PA1-PA5 and PB1-PB5 indicate an anticipated course of the wheels (i.e. predicted tracks) of the vehicle in a backing operation and the driver can easily recognize backward/forward movement of the vehicle because of the anticipated course points PA1-PA5 and PB1-PB5 displayed as if fixed on the surface of the road.

Further, in this embodiment, the distances between adjacent anticipated course points/line segments are configured to decrease gradually toward the place far from the vehicle. Thus, in the case baking up the vehicle into a parking lot having an end wall, a driver can recognize the distance between the vehicle and the end wall more precisely on the screen.

Second Embodiment

In this second embodiment, line segments are used as the marks in substitution for the points of the first embodiment to display an anticipated course. Other operations/functions are the same as or the similar to the first embodiment.

Figure 5:
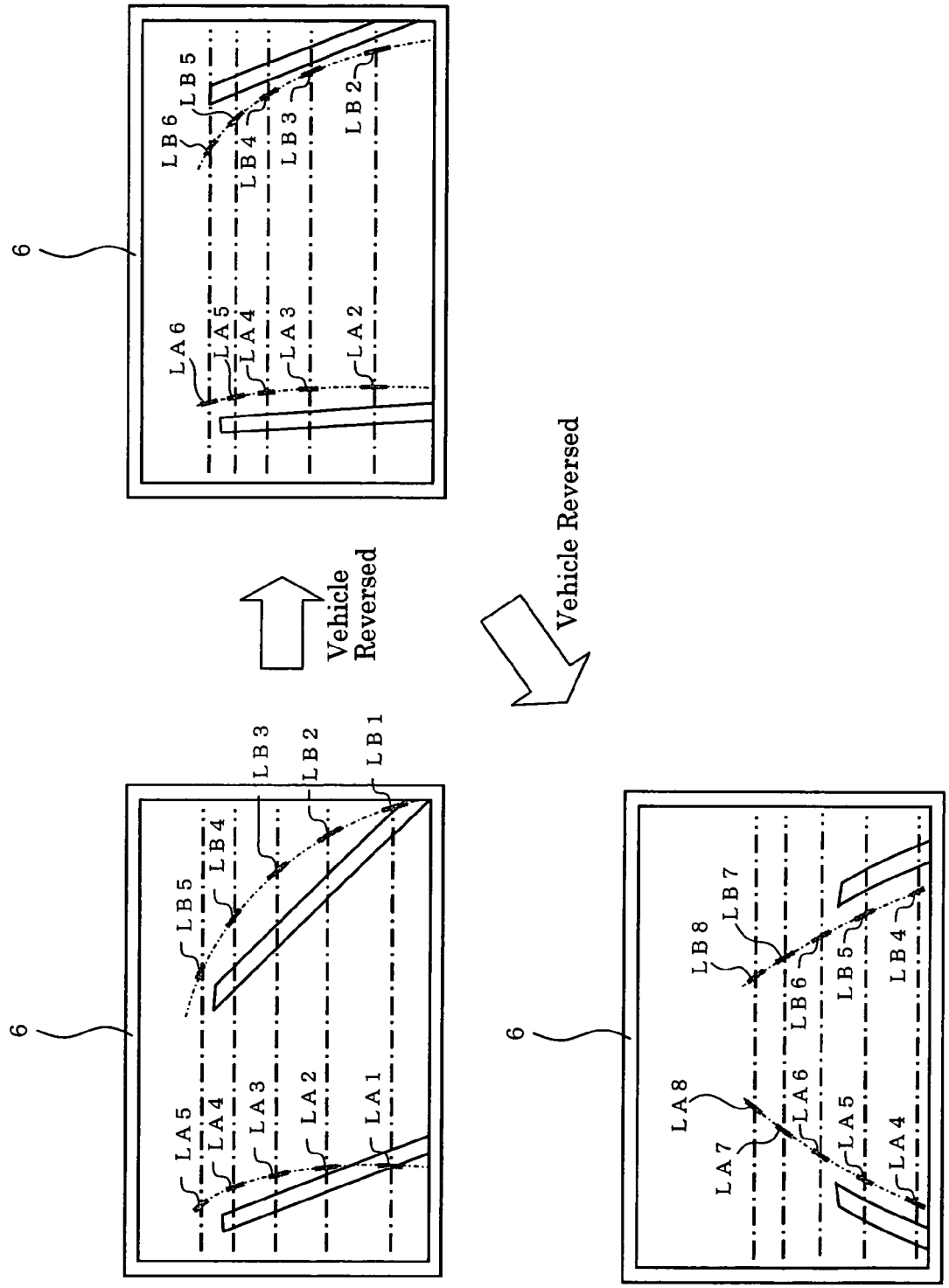
FIG. 5 is a view showing transitions of a display image of a second embodiment of the present invention.

One example of a sequence of display images in this embodiment is shown in FIG. 5. As shown in FIG. 5, advantageous effects equivalent to the first embodiment can be achieved if the discontinuous line is composed/mainly composed of successive segment lines (PA1, PA2 . . . , PB1, PB2 . . . ).

Third Embodiment

In this third embodiment, both points and line segments are used as the marks in substitution for the points of the first embodiment to display an anticipated course. Other operations/functions are the same as or the similar to the first embodiment.

Figure 6:
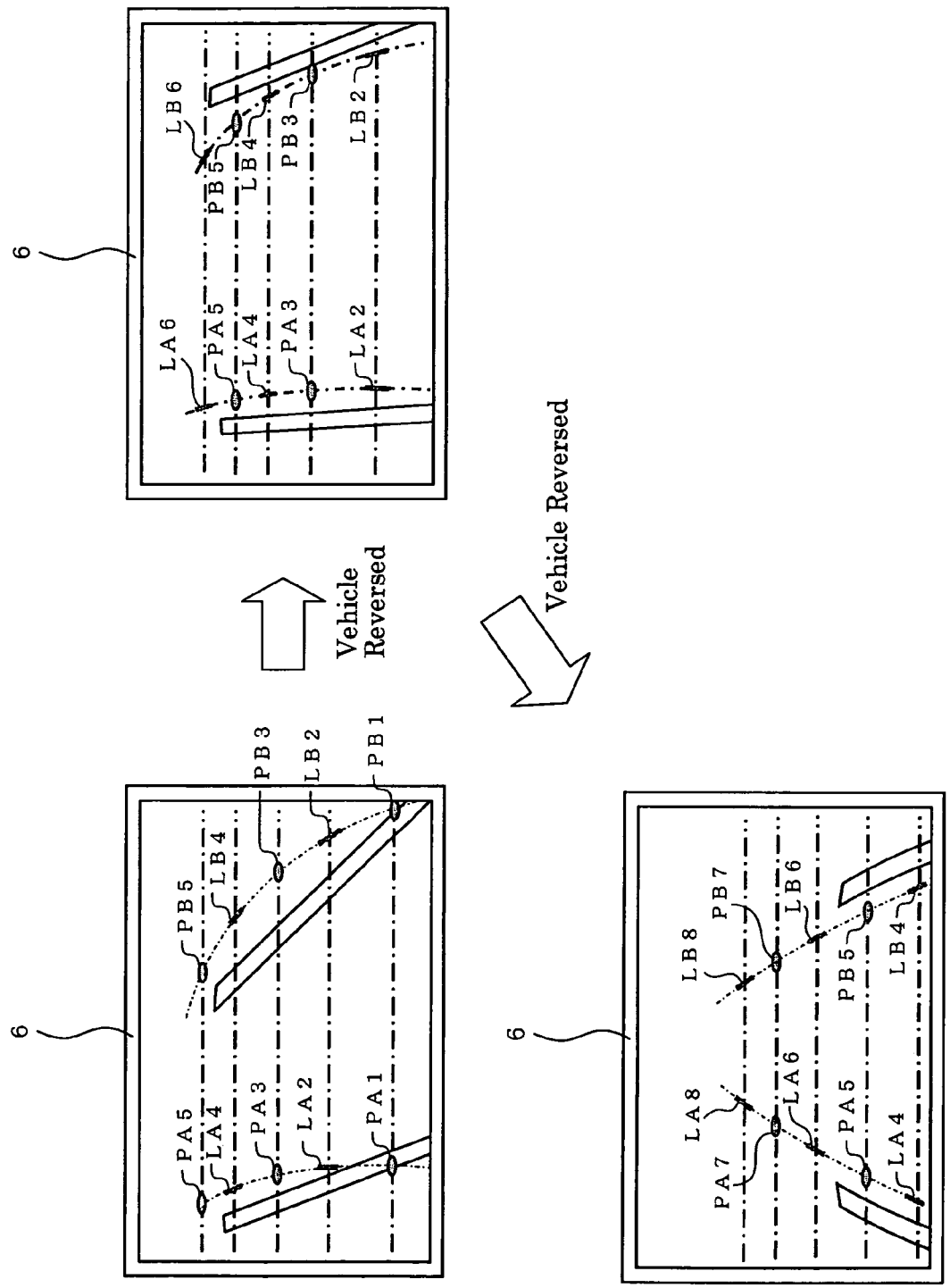
FIG. 6 is a view showing transitions of a display image of a third embodiment of the present invention.

One example of a sequence of display images in this embodiment is shown in FIG. 6. As shown in FIG. 6, advantageous effects equivalent to the first embodiment can be achieved if the discontinuous line is composed/mainly composed of points (PA1, PA3, PA5, PA7, PB1, PB3, PB5, PB7) and segment lines (PA2, PA4, PA6, PA8, PB2, PB4, PB6, PB8).

Fourth Embodiment

In this third embodiment, different colors/hues are respectively applied to the anticipated course points of the first embodiment. Other operations/functions are the same as or the similar to the first embodiment.

As shown in FIG. 7, anticipated course points PA1-PA5 having different colors each other are displayed in this embodiment (dark and light coloring is used in FIG. 7, specifically). Anticipated course points PB1-PB5 each having the same color to corresponding point PA1-PA5 are also displayed.

By way of this display manner, in addition to the advantageous effects of the first embodiment, shifting of the anticipated course points can be recognized more clearly, allowing a driver to recognize backward/forward movement of the vehicle more easily.

Above-described display manner of this embodiment can be also applied to the second and third embodiment.

Fifth Embodiment

In this fifth embodiment, marks having different outer shapes are used for indicating an anticipated course, in substitution for the points of the first embodiment. Other operations/functions are the same as or similar to the first embodiment.

As shown in FIG. 8 marks PA1-PA5 having outer shapes different from each other are displayed for indicating an anticipated track in this embodiment. Anticipated course marks PB1-PB5 each having the same outer shape to corresponding mark PA1-PA5 are also displayed.

By way of this display manner, in addition to the advantageous effects of the first embodiment, shifting of the anticipated course marks can be recognized more clearly, allowing a driver to recognize longitudinal movement of the vehicle more easily.

Above-described display manner of this embodiment can be also applied to the second, third and fourth embodiment. In this case, the modification of the outer shape of the line segment may be achieved by changing the length of the line segment.

Although some embodiments of the present invention are described above with the drawings, those embodiments are just examples of the present invention and thus the invention should not be construed to be limited only to those embodiments. Modifications or variations without beyond the sprits of the invention can be applied to those embodiments and therefore such alternatives are within the scope of the present invention.

For instance, another method for calculating an anticipated-course may be used in the parking assist apparatus.

Also, the distances between adjacent anticipated course marks may remain unchanged regardless of corresponding locations on the road of the marks.

The number of marks composing a line for indicating a predicted track (e.g. the number of anticipated course points/line segments) may be suitably chosen and not limited to the specific numbers illustrated in the embodiments above. The number of the marks may be increased so that the driver can recognize an amount of baking movement of the vehicle more precisely on the screen.

In the third embodiment, the points and line segments do not necessarily need to be disposed interchangeably on the screen and a desired combination may be used for displaying the marks.

In the fourth embodiment, colors different from the marks PA1-PA5 may be used for the marks PB1-PB5.

Also in the fourth embodiment, colors at least different from its adjacent marks may be used for the marks PA1-PA5 (PB1-PB5), instead that colors of marks PA1-PA5 (PB1-PB5) all different from each other.

In the fifth embodiment, the outer shapes of the marks PB1-PB5 may differ from those of the marks PA1-PA5.

Further, in the fifth embodiment, outer shapes at least different from its adjacent marks may be used for the marks PA1-PA5 (PB1-PB5), instead that outer shapes of marks PA1-PA5 (PB1-PB5) all different from each other.

What is claimed is:

1. A parking assist apparatus, comprising:
a camera configured to take an image of a backside of a vehicle;
a display unit configured to display the image taken by the camera;
a movement distance detecting unit configured to detect a distance of movement of the vehicle;
a steering angle detecting unit configured to detect a steering rudder angle of a steering wheel of the vehicle;
an anticipated-course calculation unit configured to calculate an anticipated course of the vehicle in backing movement according to the steering rudder angle detected by the steering angle detecting unit; and
a display control unit configured to superimpose on the image taken by the camera a discontinuous line which is formed with a series of successive marks as the anticipated course of the vehicle in backing movement calculated by the anticipated-course calculation unit and display the superimposed image on a screen of the display unit, and the display control unit is configured to update the marks on the screen of the display unit according to the distance of the movement of the vehicle detected by the movement distance detecting unit,
wherein a color and an outer shape of each mark are different from those of a mark adjacent to the each mark.

2. The parking assist apparatus according to claim 1, wherein each mark consists of a point.

3. The parking assist apparatus according to claim 1, wherein each mark consists of a line segment.

4. The parking assist apparatus according to claim 1, wherein the marks consist of points and line segments.

5. The parking assist apparatus according to claim 1, wherein the marks corresponding to within a predetermined distance from a rear of the vehicle are displayed on the screen of the display unit.

* * * * *